US009679548B1

(12) United States Patent

Bhageria et al.

(10) Patent No.: US 9,679,548 B1

(45) Date of Patent: Jun. 13, 2017

(54) STRING INSTRUMENT FABRICATED FROM AN ELECTRONIC DEVICE HAVING A BENDABLE DISPLAY

(71) Applicant: International Business Machines Corporation, Armonk, NY (US)

(72) Inventors: Gopal K. Bhageria, Kolkata (IN); Vijay Ekambaram, Tamilnadu (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/273,935

(22) Filed: Sep. 23, 2016

(51) Int. Cl.

| | |
|---|---|
| ***G09B 15/00*** | (2006.01) |
| ***G09B 15/02*** | (2006.01) |
| ***G10H 1/00*** | (2006.01) |
| ***G10H 3/18*** | (2006.01) |
| ***G10H 1/34*** | (2006.01) |

(52) U.S. Cl.

CPC ............... *G10H 3/18* (2013.01); *G10H 1/342* (2013.01); *G10H 2220/096* (2013.01); *G10H 2220/411* (2013.01); *G10H 2220/455* (2013.01)

(58) Field of Classification Search

CPC . G06F 3/0488; G06F 1/1616; H04N 21/4316; H04N 2201/0084; H04N 1/2112; G06T 7/00; G10H 1/368; G10H 2220/135; G10H 2210/091; G10H 2220/096; G10H 2220/241; G10H 2220/091; G10H 2240/145; G10H 2220/455; G02B 6/0073

See application file for complete search history.

(56) References Cited

U.S. PATENT DOCUMENTS

| | | | |
|---|---|---|---|
| 3,992,975 | A | 11/1976 | Gallagher |
| 6,911,590 | B2 | 6/2005 | Childress |

(Continued)

FOREIGN PATENT DOCUMENTS

| | | | |
|---|---|---|---|
| CN | 2694422 | Y | 4/2005 |
| WO | 2010087686 | A2 | 8/2010 |
| WO | 2012115299 | A1 | 8/2012 |

OTHER PUBLICATIONS

"The hottest 30 music tech startups of 2015", [online], [retrieved on Mar. 7, 2016]. Retrieved from the Internet <URL: http://musically.com/2015/04/23/hottest-music-tech-startups-2015-midemlab/>.

(Continued)

*Primary Examiner* — Marlon Fletcher

(74) *Attorney, Agent, or Firm* — Law Offices of Ira D. Blecker, P.C.

(57) ABSTRACT

A string instrument that includes a bendable electronic display associated with an electronic device that is bent into a bowed shape. There are external strings that extend across the bow, a camera and a non-transitory storage medium that stores instructions to: form a plurality of virtual strings embedded in the bendable electronic display and associated with the plurality of external strings; receive input from the camera to identify a resting position of each of the external strings and identify a movement of each of the external strings from the resting position; responsive to input received from the camera, map the movement in the external strings to a corresponding movement of the virtual strings; and output the corresponding movement of the virtual strings to produce a sound.

20 Claims, 7 Drawing Sheets

(56) References Cited

U.S. PATENT DOCUMENTS

| | | | | |
|---|---|---|---|---|
| 8,539,368 | B2 * | 9/2013 | Nam | G06F 3/011 463/36 |
| 8,749,495 | B2 | 6/2014 | Grant et al. | |
| 2007/0221046 | A1 * | 9/2007 | Ozaki | A63F 13/00 84/612 |
| 2011/0005367 | A1 | 1/2011 | Hwang et al. | |
| 2011/0146477 | A1 * | 6/2011 | Tsukamoto | G09B 15/003 84/485 R |
| 2012/0160079 | A1 * | 6/2012 | Little | G10H 1/38 84/613 |
| 2012/0174736 | A1 * | 7/2012 | Wang | G10H 1/0008 84/622 |
| 2013/0141395 | A1 * | 6/2013 | Holmgren | G06F 3/0421 345/175 |
| 2014/0083279 | A1 * | 3/2014 | Little | G10H 1/0008 84/609 |
| 2014/0202315 | A1 * | 7/2014 | Behringer | G10H 1/0008 84/615 |
| 2015/0027297 | A1 * | 1/2015 | Avitabile | G09B 15/003 84/470 R |
| 2015/0332660 | A1 * | 11/2015 | Adams | G10H 1/0066 84/645 |
| 2016/0077591 | A1 * | 3/2016 | Park | G06F 3/0488 345/173 |

OTHER PUBLICATIONS

"Smart Strings: Who Needs a Stradivarius When You Have an iPad?", [online], [retrieved on Mar. 7, 2016]. Retrieved from the Internet: <http://logic-pro-expert.com/logic-pro-blog/2014/05/05/smart-strings-who-needs-a-stradivarius-when-you-have-an-ipad.html#.Vc26c2cVgrk>.

Christina Warren, "Magic fiddle turns your iPad into a Violin, and it Rocks", [online], [retrieved on Mar. 7, 2016]. Retrieved from the Internet: <http://mashable.com/2010/11/09/magic-fiddle-ipad/>.

"Mobile Guitarist", [online], [retrieved on Mar. 7, 2016]. Retrieved from the Internet: <https://play.google.com/store/apps/details?id=summer.instrument.guitar>.

Jan Gulla, "Modeling the wave motion of a guitar string", Revised version of the Extended Essay submitted for the IB Diploma Programme 2011 / 2012.

Yen-Ting Liu et al., "SoundSense: 3D Gesture Sensing using Ultrasound on Mobile Devices", [online], [retrieved on Mar. 4, 2016]. Retrieved from the Internet: <mrorz.github.io/files/soundsense.pdf>.

"Osmo—Award-Winning Educational Games System for iPad", [online], [retrieved on Mar. 7, 2016]. Retrieved from the Internet: <https://www.playosmo.com/en/>.

"Real Guitar—Android Apps on Google Play", [online], [retrieved on Mar. 7, 2016]. Retrieved from the Internet: <https://play.google.com/store/apps/details?id=br.com.rodrigokolb.realguitar&hl+en>.

"ION All-Star Guitar (turn your iPad into a guitar)—review—YouTube", [online], [retrieved on Mar. 7, 2016]. Retrieved from the Internet: <https://www.youtube.com/watch?v=8S7OxLhN8Vo>.

"The Mobile Guitar: Android, iPhone and Windows Mobile apps make up a guitar", [online], [retrieved on Mar. 7, 2016]. Retrieved from the Internet: <https://www.youtube.com/watch?v=G_-2OIGbLec>.

"Ultrasound Gesture Recognition—Elliptic Labs", [online], [retrieved on Mar. 7, 2016]. Retrieved from the Internet: <http://web.archive.org/web/20141225035729/http://www.ellipticlabs.com/?page_id=3107>.

* cited by examiner

STRING INSTRUMENT FABRICATED FROM AN ELECTRONIC DEVICE HAVING A BENDABLE DISPLAY

BACKGROUND

The present exemplary embodiments pertain to a string instrument and, more particularly, pertain to a string instrument fabricated from an electronic device such as a tablet or a mobile phone having a bendable display that may be have strings attached to the bendable display.

There have been proposed software applications that may virtualize musical string instruments. In such an application, a user may play the virtual musical string instrument by touching the strings displayed on the display. The display may be associated with, for example, a tablet.

However, the user cannot get the real feel for the musical string instrument because the strings are only graphically displayed on the display and the user cannot physically interact with the strings.

BRIEF SUMMARY

The various advantages and purposes of the exemplary embodiments as described above and hereafter are achieved by providing, according to an aspect of the exemplary embodiments, a string instrument comprising: a bendable electronic display associated with an electronic device, the bendable electronic display being bent into a bowed shape having a first end and a second end; a plurality of external strings at the first end and extending to the second end; a camera; and a non-transitory storage medium. The non-transitory storage medium stores instructions to: form a plurality of virtual strings embedded in the bendable electronic display and associated with the plurality of strings; receive input from the at least one camera to identify a resting position of each of the plurality of external strings and identify a movement of each of the plurality of external strings from the resting position; responsive to input received from the at least one camera, map the movement in the plurality of external strings to a corresponding movement of the plurality of virtual strings; and output the corresponding movement of the plurality of virtual strings to produce a sound.

According to another aspect of the exemplary embodiments, there is provided a computer-implemented method of converting a bendable electronic display associated with an electronic device to a string instrument comprising: bending the bendable electronic display into a bowed shape having a first end and a second end; extending a plurality of external strings between the first end and the second end; inputting by a camera in the bendable electronic display a resting position of each of the plurality of external strings; identifying by the camera a movement of each of the plurality of external strings from the resting position and outputting the movement of each of the plurality of external strings to a computer processor; responsive to input received from the camera, mapping by the computer processor the movement in each of the plurality of external strings to a corresponding sound; and outputting the corresponding sounds from each of the plurality of external strings to an device for listening by a human listener.

According to a further aspect of the exemplary embodiments, there is provided a computer program product for converting a bendable electronic display associated with an electronic device to a string instrument, the computer program product comprising a computer readable storage medium having program instructions embodied therewith, the program instructions executable by a processor to cause the processor to perform a method comprising: bending the bendable electronic display into a bowed shape having a first end and a second end; extending a plurality of external strings between the first end and the second end; inputting by a camera in the bendable electronic display a resting position of each of the plurality of external strings; identifying by the camera a movement of each of the plurality of external strings from the resting position and outputting the movement of each of the plurality of external strings to a computer processor; responsive to input received from the camera, mapping by the computer processor the movement in each of the plurality of external strings to a corresponding sound; and outputting the corresponding sounds from each of the plurality of external strings to an device for listening by a human listener.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

Figure 1:
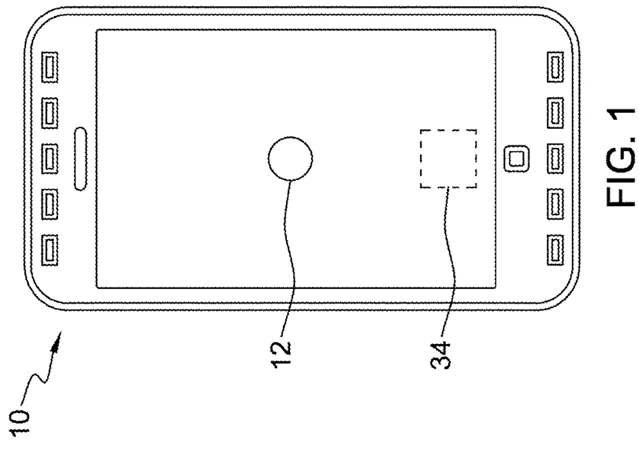
FIG. 1 is a perspective view of a bendable electronic display in a rest position.

Referring to the Figures in more detail, and particularly referring to FIG. 1, there is illustrated a perspective view of a bendable electronic display 10. The bendable electronic display 10 may also be referred to as a flexible display. Such a bendable electronic display 10 may be, or form a part of, a device such as, for example, a mobile phone or a tablet. For purposes of illustration and not limitation, the bendable electronic display 10 in FIG. 1 is a mobile phone. In addition to a forward-facing camera and sometimes also a rearward-facing camera, both of which may be typically used for taking pictures of scenery, persons, objects, etc., the bendable electronic display 10 may further include a camera 12 for a use as described hereafter.

The materials that form the bendable electronic display 10 may include but not be limited to organic light-emitting diode (OLED) and (active-matrix organic light-emitting diode (AMOLED).

Figure 2:
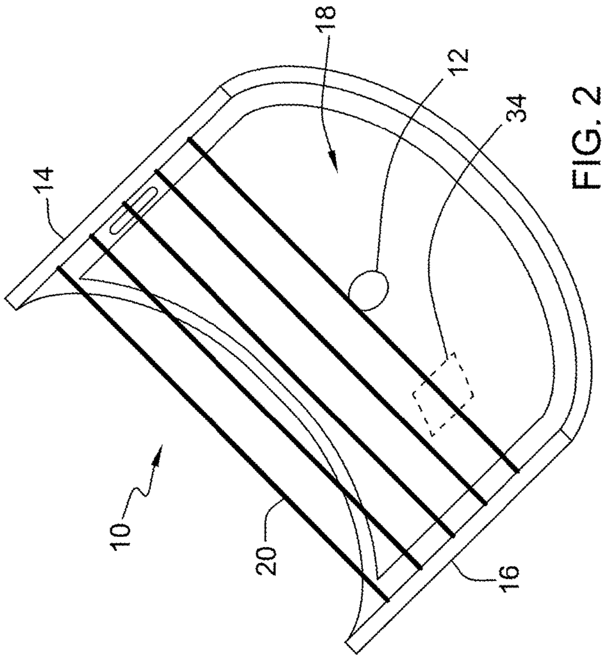
FIG. 2 is a perspective view of the bendable electronic display of FIG. 1 in a bowed position and having external strings.

The bendable electronic display 10 is conveniently bendable from its typically flat rest position shown in FIG. 1 to a bowed configuration shown in FIG. 2. When in its bowed position, the bendable electronic display 10 will have been converted to a string instrument.

Figure 4:
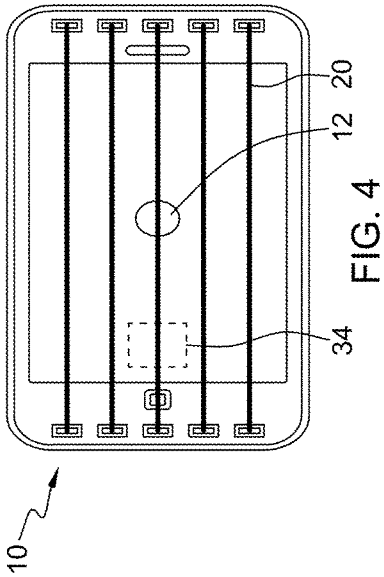
FIG. 4 is a plan view of FIG. 2.
Figure 3:
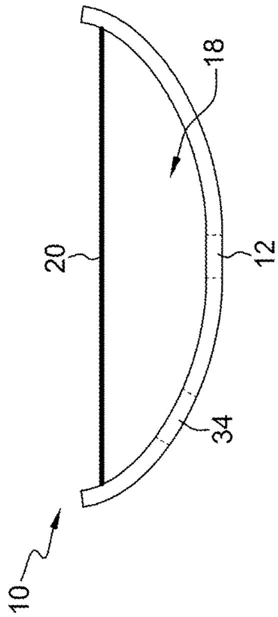
FIG. 3 is a side view of FIG. 2.

FIG. 3 is a side view and FIG. 4 is a plan view of the bendable electronic display 10. FIGS. 2, 3 and 4 should be referenced together in the following discussion of the bendable electronic display 10.

With the bendable electronic display 10 in its bent position, the bendable electronic display 10 forms a curve having a first end 14 and a second end 16. Extending across the open area 18 of the curve, external strings 20 have been added that extend between the first end 14 and the second end 16. By "external strings", it is meant that these strings are out of the plane of the bendable electronic display 10.

In one exemplary embodiment, the external strings 20 are physical articles such as metallic wires or nonmetallic strings.

In another exemplary embodiment, the external strings 20 could be light rays.

As can be seen, camera 12 in one exemplary embodiment is located underneath the external strings 20. Camera 12 views the position of the external strings 20. To view all of the external strings 20 simultaneously, it is preferred that camera 12 has a wide angle lens. Through object recognition techniques in video processing, each of the external strings 20 are uniquely identified by the camera 12 and corresponding virtual string objects are created by software present in computing device 34 in the bendable electronic display 10. Any change in position of the external strings 20 is noted by the camera 12 and replicated in the virtual string objects. The replicated change in the virtual string objects would be outputted by computing device 34 to an audio device such as a speaker, earpiece or other listening device to create a series of sounds such as music.

A user of the bendable electronic display 10 may use, for example, a guitar pick or a stylus to "play" the bendable electronic display 10 as if it were an actual string instrument. In one exemplary embodiment where the external strings 20 are physical articles, the user plucking the external strings 20 with a guitar pick would cause the external strings 20 to change position to make the series of sounds. In another exemplary embodiment where the external strings 20 are light rays, movement of a stylus through the light rays would break the path of the light rays which would then, again, be replicated in the virtual string objects and outputted to the audio device.

According to the exemplary embodiments, a user of the bendable electronic display 10 would get the feel of a real string instrument by physically interacting with the external strings 20.

Figure 5:
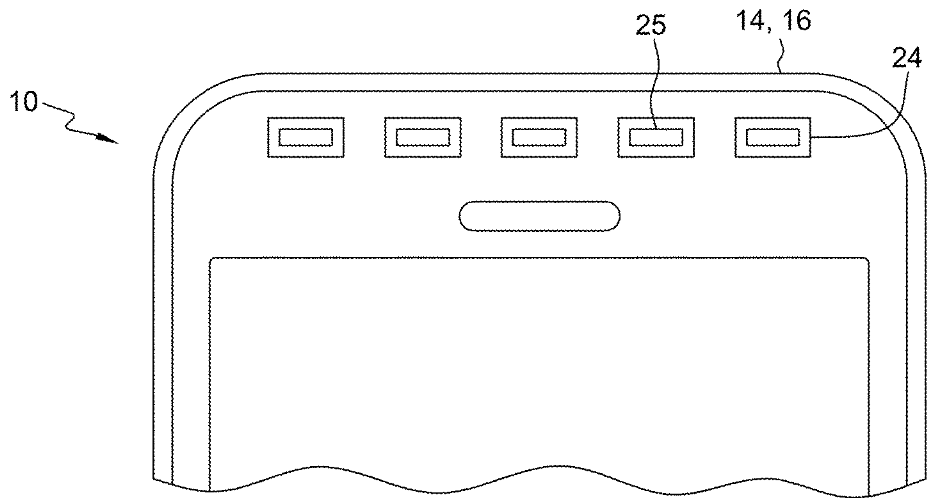
FIG. 5 is an enlarged view of one end of the bendable electronic display of FIGS. 2 to 4.
Figure 6:
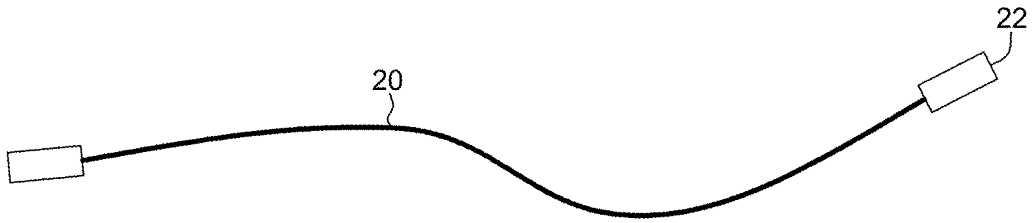
FIG. 6 is a view of an external string that may be used in connection with the bendable electronic display of FIGS. 2 to 5.

Referring now to FIG. 5, an enlarged view of one end 14, 16 of the bendable electronic display 10 is shown in greater detail. In one exemplary embodiment, each end 14, 16 of the bendable electronic display 10 may have ports 24 for receiving the physical external strings 20. FIG. 6 illustrates one exemplary embodiment of an external string 20 which may have connectors 22 for mating with the ports 24 in the first and second ends 14, 16 of the bendable electronic display. Ports 24 may have sensors 25 to indicate that a connector 22 and port 24 have been engaged. The sensors would send a signal to the computing device 34 on the bendable electronic display 10 to indicate that the external string 20 is in active mode and ready to produce sounds.

Figure 7:
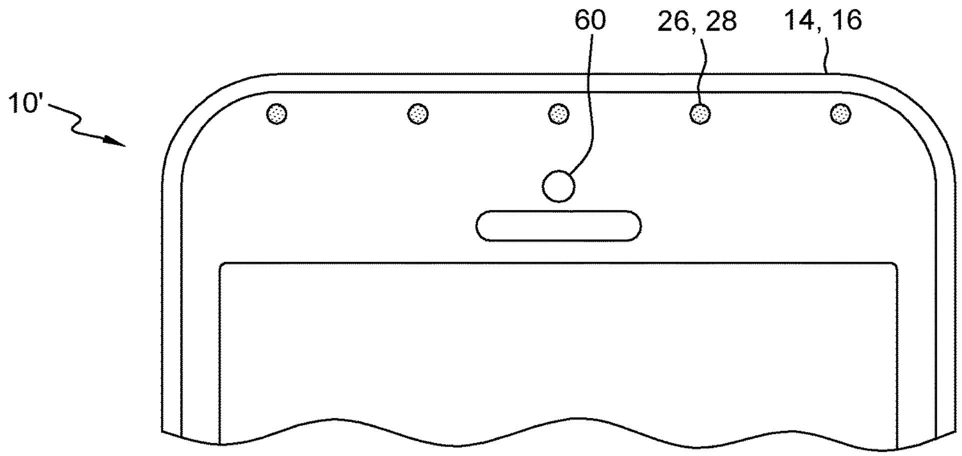
FIG. 7 is an enlarged view of one end of another embodiment of the bendable electronic display of FIGS. 2 to 4.

Referring now to FIG. 7, there is an enlarged view of one end 14, 16 of another embodiment of the bendable electronic display 10'. In this exemplary embodiment, there are light ports 26 for shining a light ray between the first 14 and the second end 16. There may be one light port 26 for each external string 20. There may be a separate light source 28 in each light port 26 or, it is within the scope of the exemplary embodiments to have one light source and a separate lens system to shine light rays through each light port 26. The light source 28 may be any light source but collimated light sources such as a laser are preferred. Lasers in particular are preferred because the laser light may be viewable from the side which would enable a user of the bendable electronic display 10' to see the external strings 20 made from the laser light.

Figure 8:
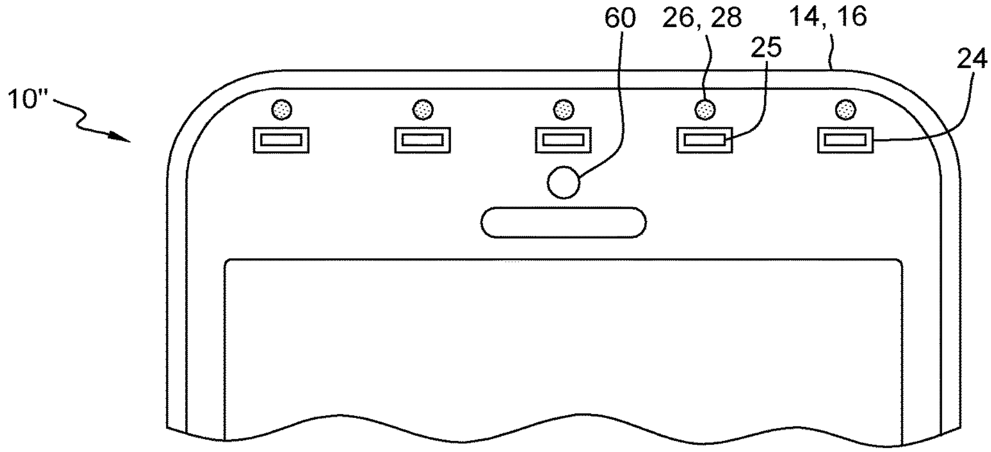
FIG. 8 is an enlarged view of one end of a further embodiment of the bendable electronic display of FIGS. 2 to 4.

A further exemplary embodiment is illustrated in FIG. 8 which illustrates an enlarged view of one end 14, 16 of another embodiment of the bendable electronic display 10". The exemplary embodiment illustrated in FIG. 8 is actually a combination of the exemplary embodiments illustrated in FIGS. 5 and 7 in that the bendable electronic display 10" has both ports 24 and sensors 25 for connecting to an external string 20 as well as at least one light source 28 and light ports 26.

In the exemplary embodiments illustrated in FIGS. 7 and 8, the bendable electronic display 10', 10" may have a camera 60 at the one end 14, 16 instead of, or possibly in addition to, camera 12 shown in FIGS. 1 to 4. Camera 60 would perform the same tasks as camera 12. To view all of the external strings 20 simultaneously, it is preferred that camera 60 has a wide angle lens. It is also within the scope of the exemplary embodiments for camera 60 to be present in the exemplary embodiment of FIGS. 1 to 4.

Figure 9:
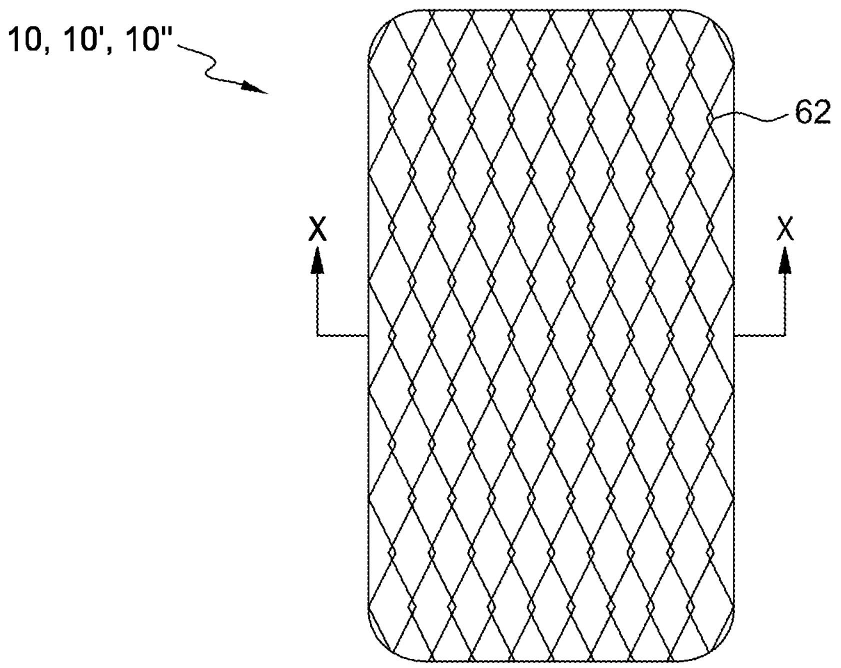
FIG. 9 is a plan view of a back side of exemplary embodiments of the bendable electronic display showing an embedded wire mesh.
Figure 10:
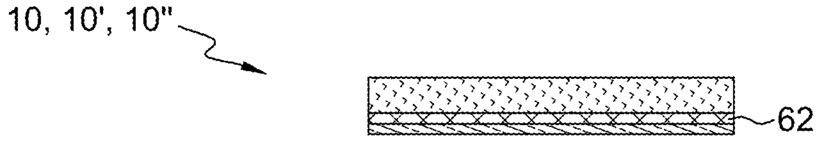
FIG. 10 is a cross sectional view of the bendable electronic display of FIG. 9.

In one exemplary embodiment, it may be desirable to have a supporting structure to hold the bendable electronic display in the bent position as shown in FIGS. 2 and 3. A wire mesh affixed to the back of the bendable electronic display, or embedded within it, may be used to hold the bendable electronic display in the bent position. Applying a force to the wire mesh will cause the bendable electronic display to bend and stay in the bent position. When the bendable electronic display is no longer being used to produce sounds or music, the bendable electronic display may be returned back to its straight shape. Any material may be used for the wire mesh so long as it may be flexed repeatedly without breaking while staying in the bent position as needed. Ductile metal wire meshes, for example, comprising steel, copper, titanium, may be used. FIG. 9 shows an example of the wire mesh 62 embedded in a back side of the bendable electronic display 10, 10', 10". FIG. 10 shows a cross sectional view of the bendable electronic display 10, 10', 10" with the embedded wire mesh 62.

As shown in FIGS. 1 to 4, the bendable electronic display 10 may be a self-supporting article such as a tablet or mobile phone, for example, with all of the necessary computing device and wiring buried in the bendable electronic display 10.

Figure 11:
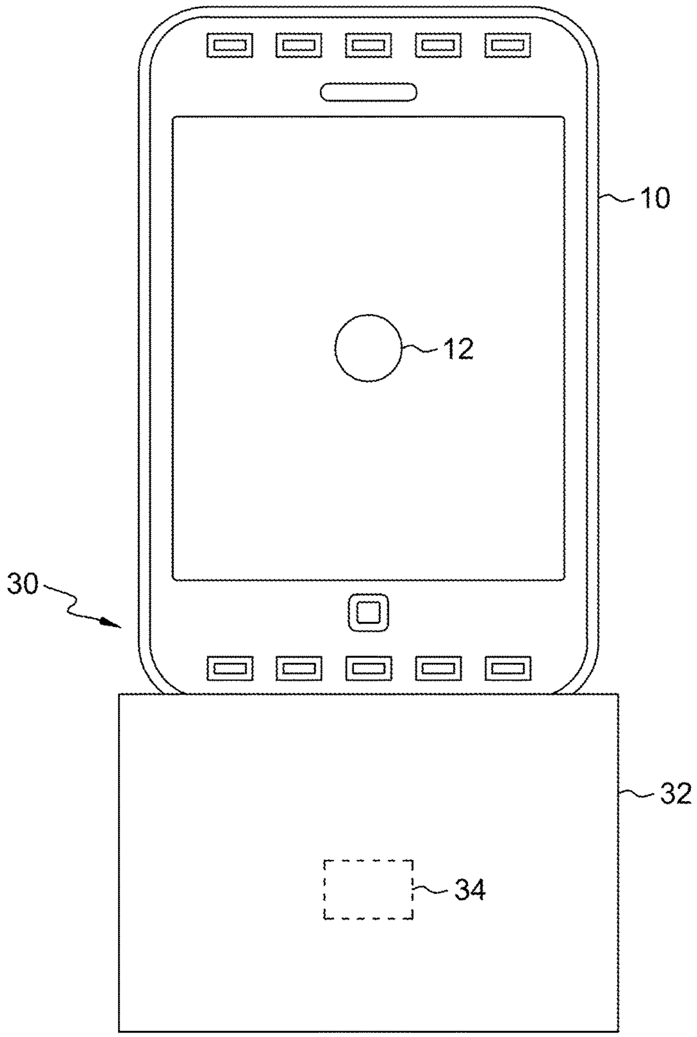
FIG. 11 is a plan view of another exemplary embodiment of the bendable electronic display of FIGS. 2 to 4 in a support base.
Figure 12:
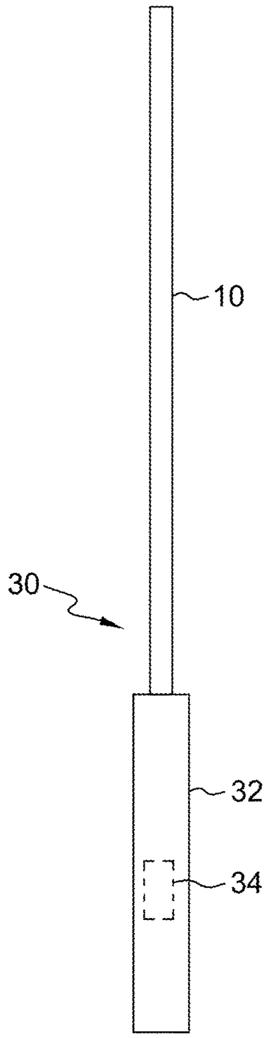
FIG. 12 is a side view of the bendable electronic display of FIG. 11.

It is also within the scope of the exemplary embodiments for the bendable electronic display 10 to form just a part of the entire device. FIGS. 11 and 12 illustrate a device 30, such as a mobile phone or tablet that includes a base 32 that supports the bendable electronic display 10. Bendable electronic display 10, 10', 10" is physically and electrically connected to the base 32. Base 32 may contain the electronics such as computing device 34 that provides the intelligence for the device 30 and operates the bendable electronic display 10.

The exemplary embodiments may be used to emulate many different string instruments including musical instruments such as guitars, violins, cellos, etc.

Figure 13:
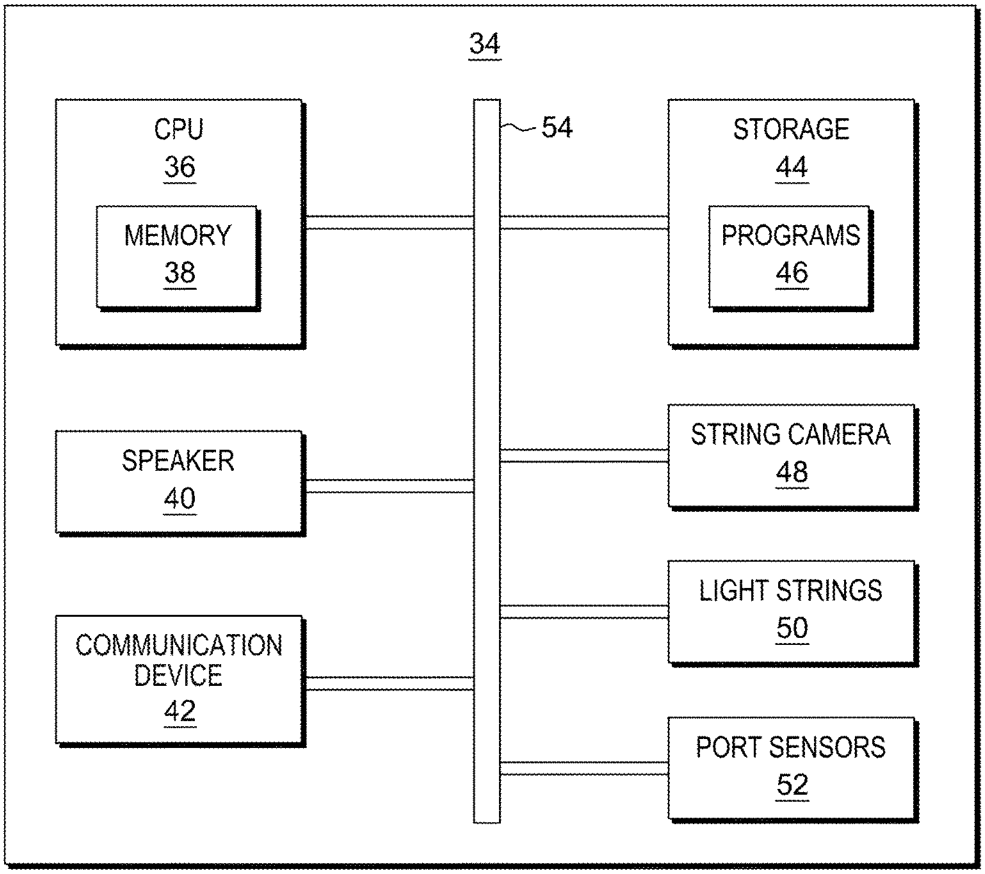
FIG. 13 is an illustration of a computing device useful in the exemplary embodiments of the bendable electronic display.

FIG. 13 illustrates further details of the computing device 34. Included within computing device 34 may be a processor such as central processing unit (CPU) 36 having memory 38. Also included may be storage 44 having computer programs 46. Storage may be resident within the computing device 34 or may be remotely located such as in the cloud. Among the computer programs 46 may be an object recognition program to receive input from the camera 12 and process the images received from the camera 12. The images may be mapped to a sound by a sound processor program and output an indication, for example a sound, that the external strings 20 have been moved.

Figure 14:
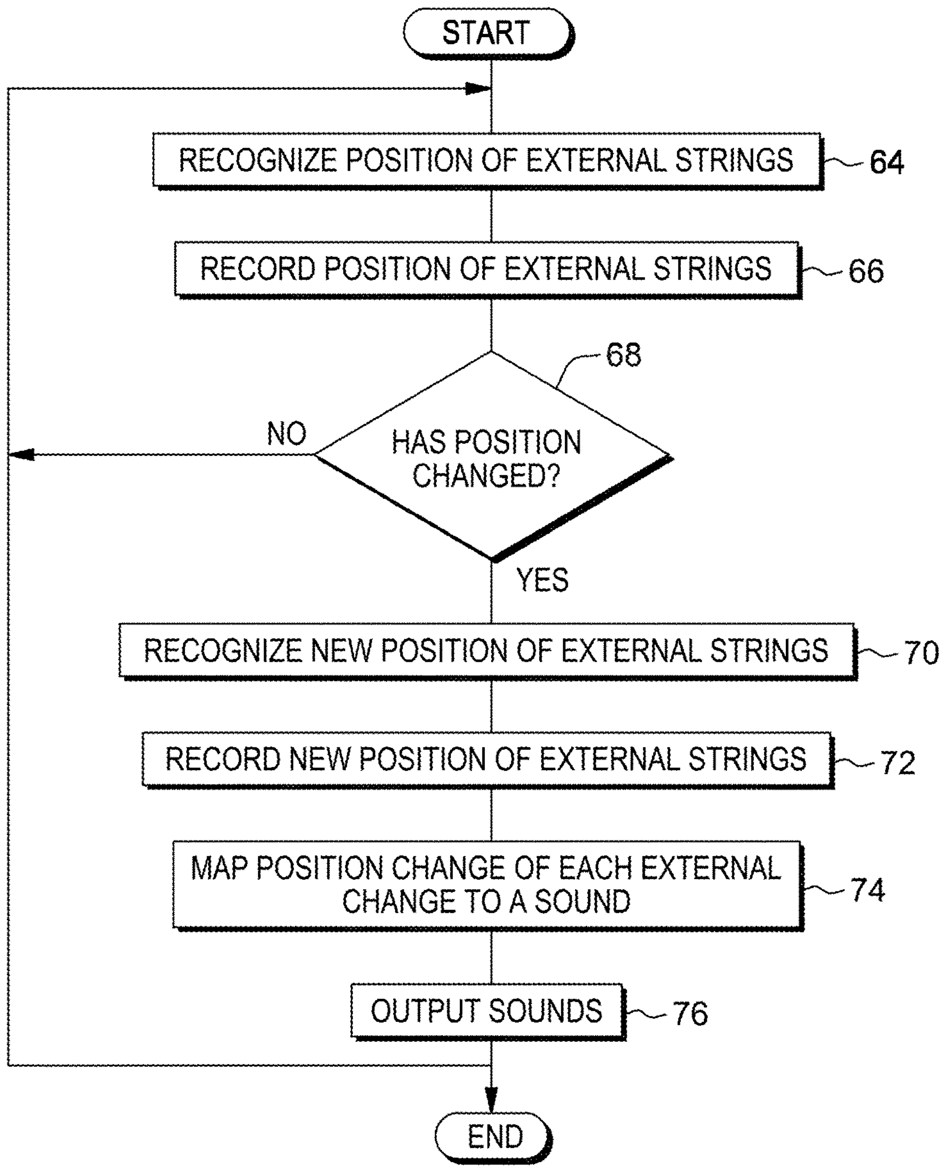
FIG. 14 is a flow chart illustrating an operation of the bendable electronic display of the exemplary embodiments.

Referring now in addition to FIG. 14, there is illustrated an exemplary embodiment of an algorithm for producing sounds. The algorithm may start, for example, by turning on an application in programs 46 to turn the bendable electronic display into a sound producing instrument. Turning on the application may activate the sensors to record the presence of the external strings as explained previously and also activate the one or more string cameras 48 that are present. The string camera(s) 48 through an object recognition program in programs 46 recognizes the position of each of the external strings, step 64.

The position of each external string is recorded, for example in memory 38, step 66.

The object recognition program may check if the position of any of the external strings has changed its position, step 68. If the answer is no, the algorithm follows the "NO" path and loops back to step 64 to recognize the position of the external strings. This loop may continue indefinitely until the position of any of the external strings has changed or until the application is shut off.

If the position of any of the external strings has changed, the algorithm follows the "YES" path to recognize the new position of any or all of the external strings, step 70.

The new position of the external strings is recorded, for example, in memory 38, step 72.

Each position change of the external strings is mapped to a sound by a sound processor program in programs 46, step 74.

The sounds are then output to, for example, a speaker by speaker instructions 40 or an earpiece, step 76.

After outputting the sounds, the algorithm may loop back to recognizing the position of the external strings to start the algorithm over again. This process may continue indefinitely until the user decides to end the application.

It should be understood that the algorithm may process multiple position changes of the external strings at one time or may process the position change of each external string serially.

The sound output by the object recognition program may be played by speaker instructions 40 to a speaker (not shown) in the bendable electronic display 10, 10', 10" or transmitted over communication device 42 to another device. For example, the computing device 34 may be connected by a short range radio communication device, such as Bluetooth, to broadcast the sound through an external speaker. Communication device 42 may be any communication device including but not limited to WiFi, cellular, satellite, short range radio, etc.

The computing device 34 may further include string camera instructions 48 to operate the cameras 12, 60 and light strings instructions to operate the light source(s) 28 shown in FIGS. 7 and 8. In addition, computing device 34 may have port sensors instructions 52 to operate the port sensors described with respect to FIGS. 6 and 8.

All of the components of the computing device may be connected by bus 54.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A string instrument comprising:

a bendable electronic display associated with an electronic device, the bendable electronic display being bent into a bowed shape having a first end and a second end;

a plurality of external strings at the first end and extending to the second end;

a camera; and a non-transitory storage medium that stores instructions to:

form a plurality of virtual strings embedded in the bendable electronic display and associated with the plurality of strings;

receive input from the at least one camera to identify a resting position of each of the plurality of external strings and identify a movement of each of the plurality of external strings from the resting position;

responsive to input received from the at least one camera, map the movement in the plurality of external strings to a corresponding movement of the plurality of virtual strings; and output the corresponding movement of the plurality of virtual strings to produce a sound.

2. The string instrument of claim 1 further comprising at least one light source in the bendable electronic display and wherein the plurality of external strings comprise light beams from the at least one light source.

3. The string instrument of claim 2 wherein there are a plurality of light sources such that there is one light source per external string.

4. The string instrument of claim 1 wherein the plurality of external strings are selected from the group consisting of metallic wires and nonmetallic wires.

5. The string instrument of claim 1 further comprising connector ports on the bendable electronic display to receive the plurality of external strings.

6. The string instrument of claim 5 wherein the plurality of external strings are selected from the group consisting of metallic wires and nonmetallic wires.

7. The string instrument of claim 5 further comprising a sensor to sense when the plurality of external strings are inserted into the connector ports.

8. The string instrument of claim 1 further comprising a base to support the bendable electronic display.

9. The string instrument of claim 1 further comprising a wire mesh embedded in the bendable electronic display.

10. A computer-implemented method of converting a bendable electronic display associated with an electronic device to a string instrument comprising:

bending the bendable electronic display into a bowed shape having a first end and a second end;

extending a plurality of external strings between the first end and the second end;

inputting by a camera in the bendable electronic display a resting position of each of the plurality of external strings;

identifying by the camera a movement of each of the plurality of external strings from the resting position and outputting the movement of each of the plurality of external strings to a computer processor;

responsive to input received from the camera, mapping by the computer processor the movement in each of the plurality of external strings to a corresponding sound; and outputting the corresponding sounds from each of the plurality of external strings to a device for listening by a human listener.

11. The method of claim 10 further comprising providing a light source in the bendable electronic display and wherein the plurality of external strings comprise light beams from the light source.

12. The method of claim 10 further comprising providing metallic wires or nonmetallic wires and wherein the plurality of external strings are metallic wires or nonmetallic wires.

13. The method of claim 12 further comprising providing connector ports on the bendable electronic display to receive the plurality of external strings.

14. The method of claim 13 further comprising sensing by a sensor to sense when the connector ports receive the plurality of external strings.

15. The method of claim 10 further comprising providing a base to support the bendable electronic display.

16. A computer program product for converting a bendable electronic display associated with an electronic device to a string instrument, the computer program product comprising a computer readable storage medium having program instructions embodied therewith, the program instructions executable by a processor to cause the processor to perform a method comprising:

bending the bendable electronic display into a bowed shape having a first end and a second end;

extending a plurality of external strings between the first end and the second end;

inputting by a camera in the bendable electronic display a resting position of each of the plurality of external strings;

identifying by the camera a movement of each of the plurality of external strings from the resting position and outputting the movement of each of the plurality of external strings to a computer processor;

responsive to input received from the camera, mapping by the computer processor the movement in each of the plurality of external strings to a corresponding sound; and outputting the corresponding sounds from each of the plurality of external strings to an device for listening by a human listener.

17. The computer program product of claim 16 wherein the plurality of external strings comprise light beams from a light source.

18. The computer program product of claim 16 wherein the plurality of external strings comprise metallic wires or nonmetallic wires.

19. The computer program product of claim 16 further comprising receiving by connector ports the plurality of external strings.

20. The computer program product of claim 19 further comprising sensing by a sensor to sense when the connector ports receive the plurality of external strings.

* * * * *